(No Model.)　　　　　　　　　　　　　　　　　　5 Sheets—Sheet 1.
DE W. C. SANFORD.
Refrigerator Building.
No. 239,342.　　　　　　　　Patented March 29, 1881.
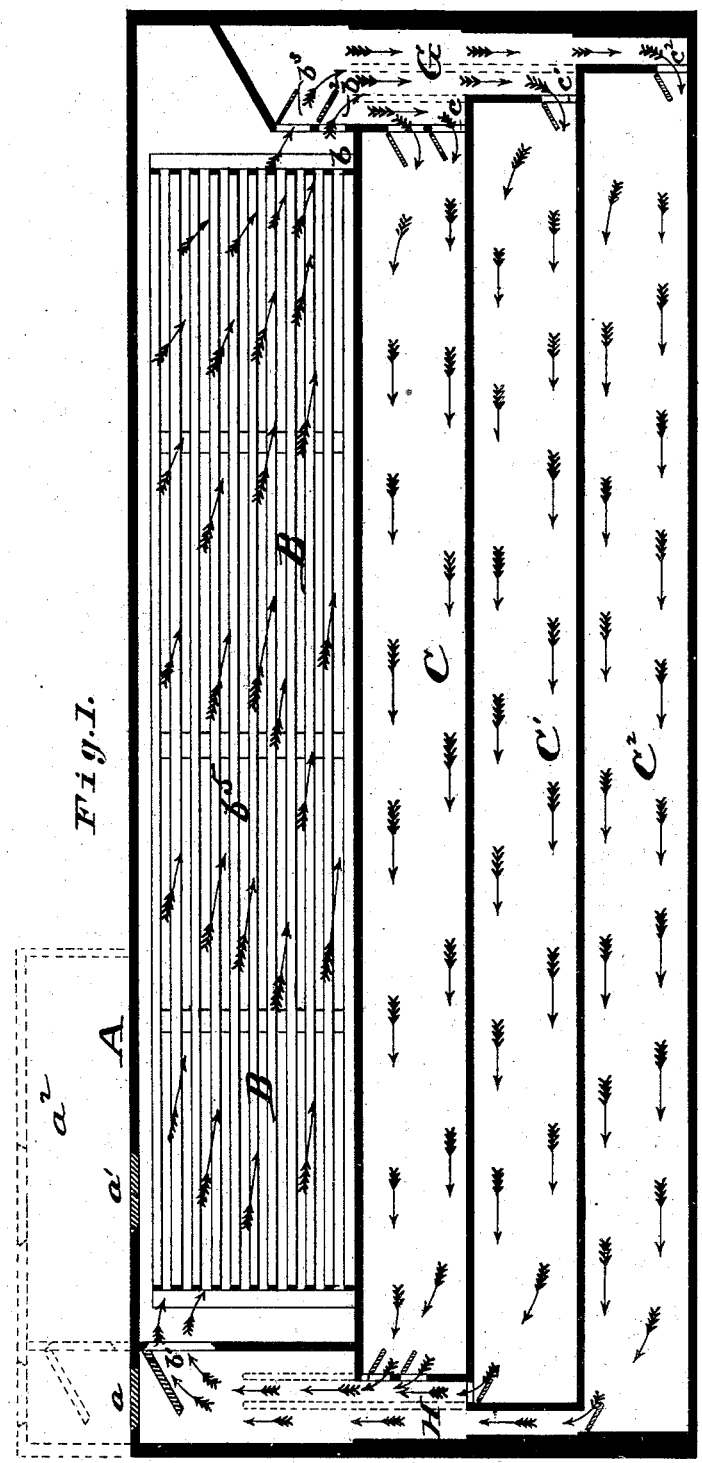
Attest: Charles Pickles, Jno. N. Straat.
Inventor: DeWitt C. Sanford by C. D. Moody, atty.

(No Model.)   DE W. C. SANFORD.   5 Sheets—Sheet 2.
Refrigerator Building.
No. 239,342.   Patented March 29, 1881.
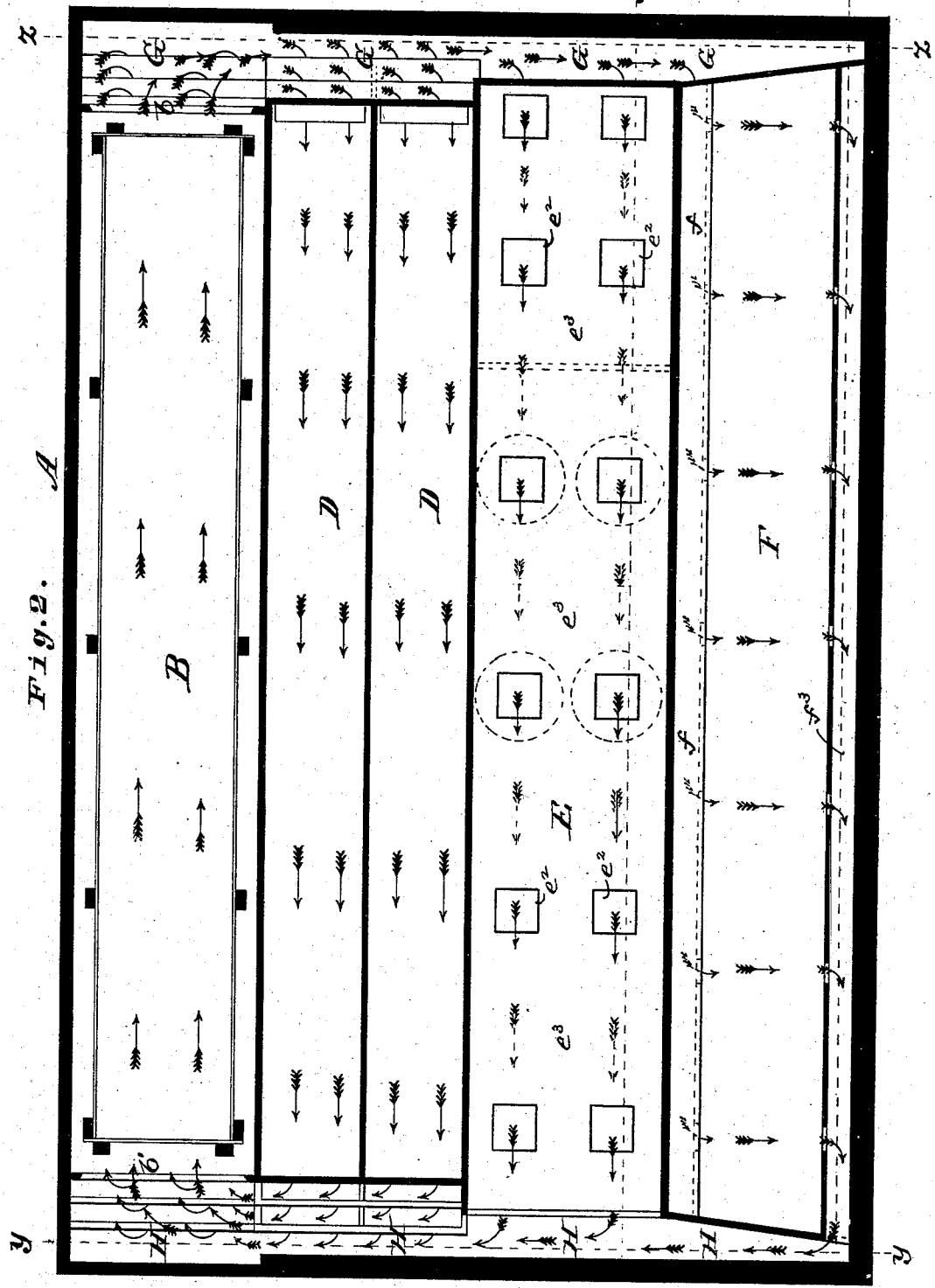
Attest: Charles Pickly, Jno. N. Straat
Inventor: D. W. C. Sanford by C. D. Moody, atty.

(No Model.) 5 Sheets—Sheet 3.
DE W. C. SANFORD.
Refrigerator Building.
No. 239,342. Patented March 29, 1881.
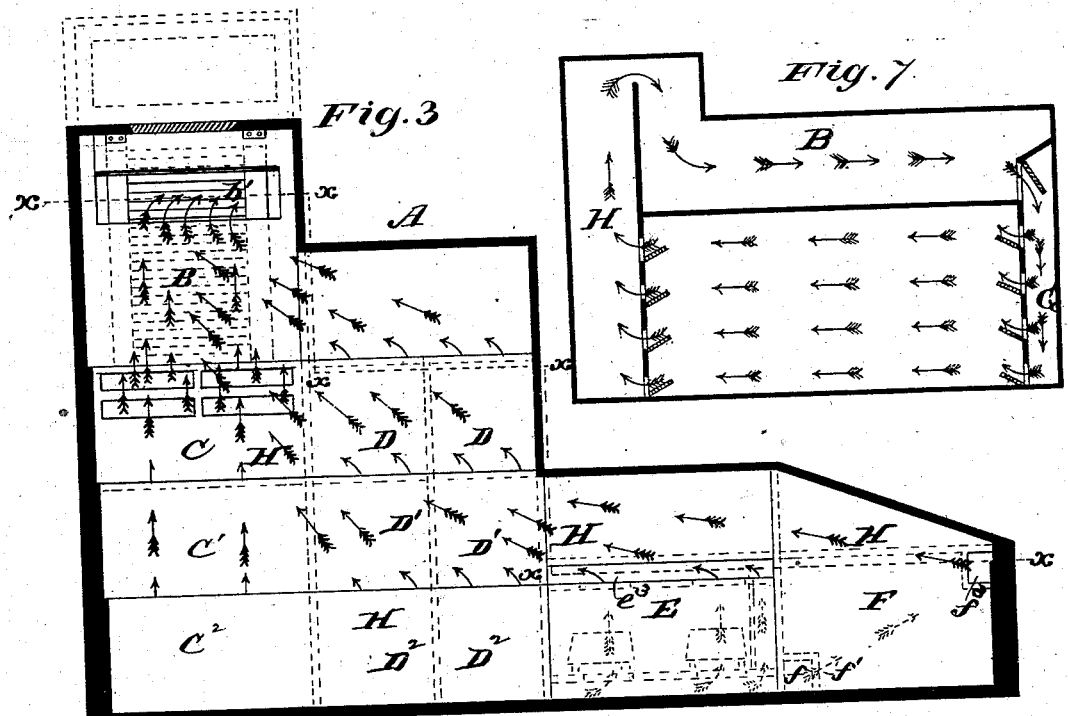
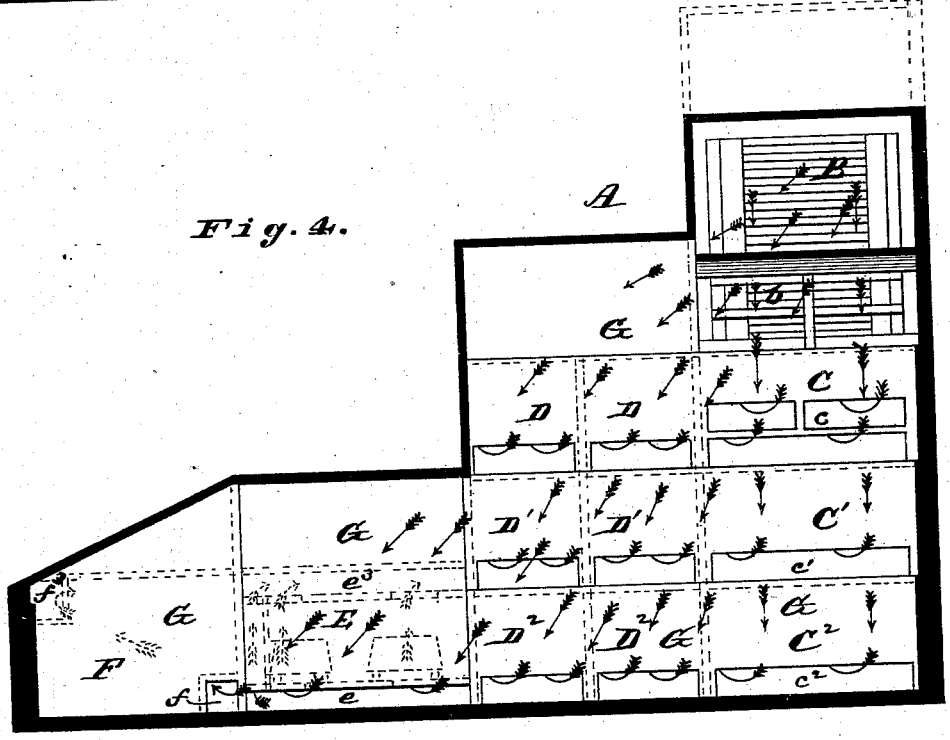
Attest: Charles Pickles, Jno. N. Straal
Inventor: De W. H. C. Sanford by C. H. Moody, atty.

(No Model.)  
5 Sheets—Sheet 4.
DE W. C. SANFORD.
Refrigerator Building.
No. 239,342. Patented March 29, 1881.
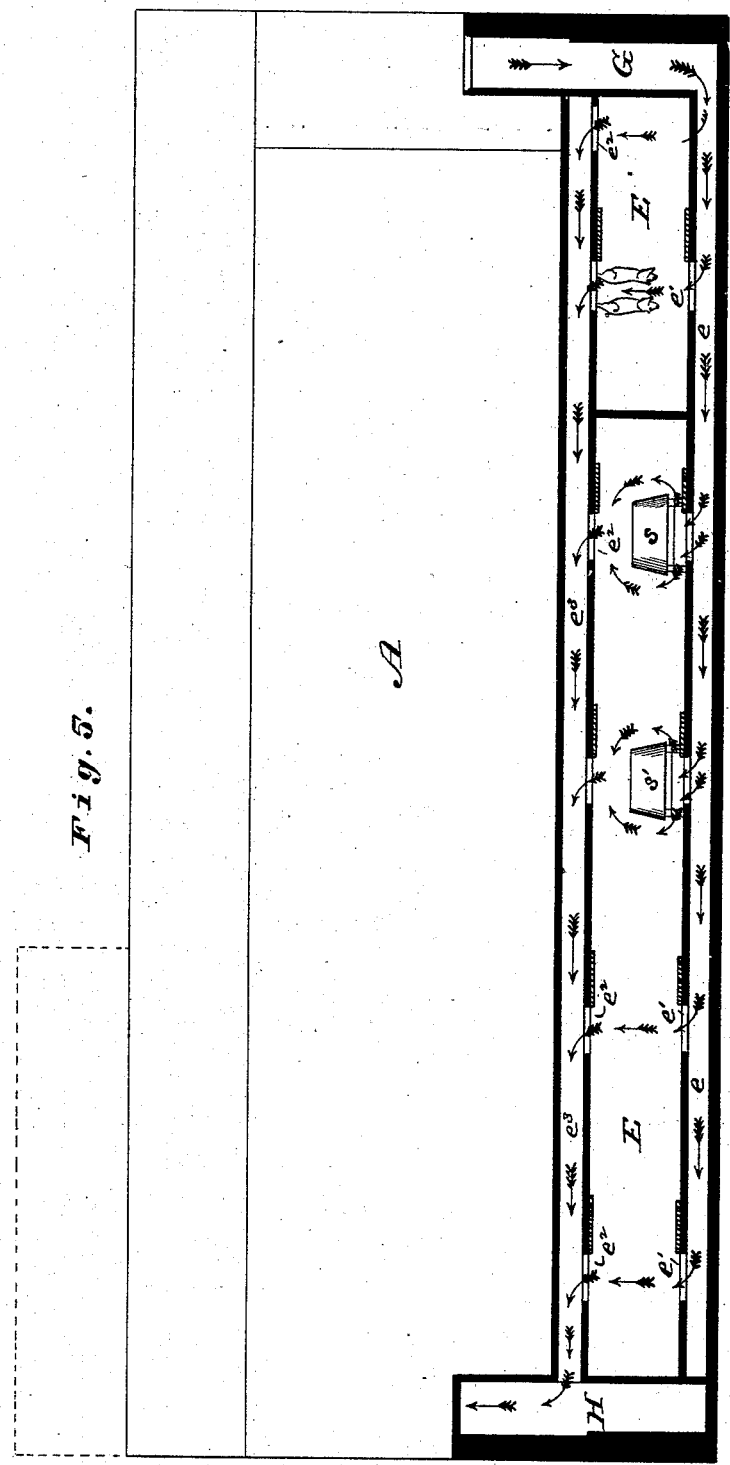
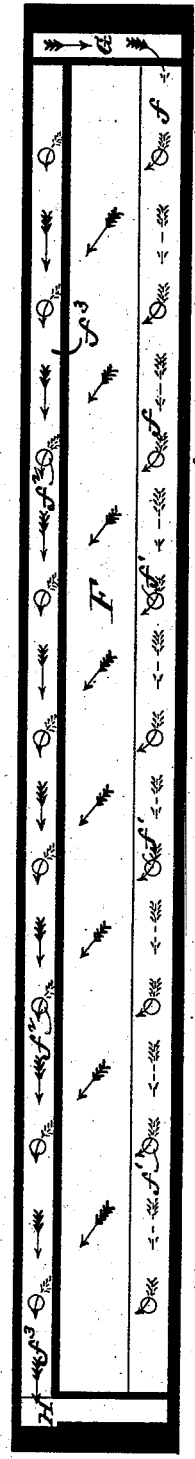
Attest: Charles Pickles, Jno. N. Straat
Inventor: DeWitt C. Sanford by C. D. Moody, atty.

(No Model.)  DE W. C. SANFORD.  5 Sheets—Sheet 5.
Refrigerator Building.
No. 239,342.    Patented March 29, 1881.

Attest:
Charles Pickles
Jno. N. Straat

Inventor:
DeWitt C. Sanford
by C. D. Moody, atty.

UNITED STATES PATENT OFFICE.

DE WITT C. SANFORD, OF ST. LOUIS, MISSOURI.

REFRIGERATOR-BUILDING.

SPECIFICATION forming part of Letters Patent No. 239,342, dated March 29, 1881.

Application filed May 20, 1880. (No model.)

*To all whom it may concern:*

Be it known that I, DE WITT C. SANFORD, of St. Louis, Missouri, have made a new and useful Improvement in Refrigerators and Refrigerating-Houses, of which the following is a full, clear, and exact description, reference being had to the annexed drawings, making part of this specification, in which—

Figure 8:
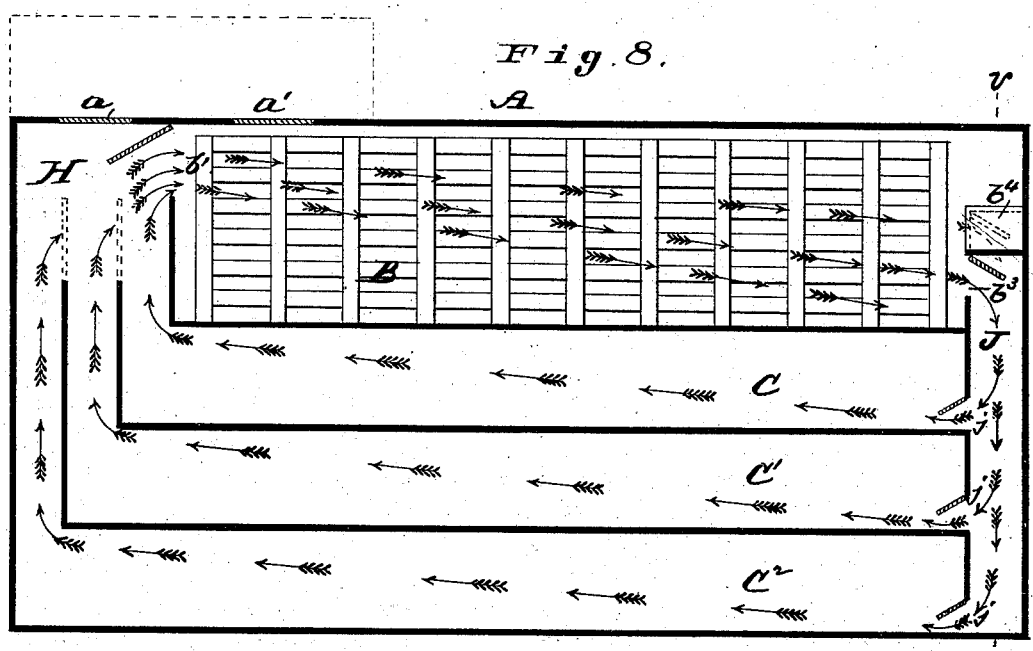
Figure 9:
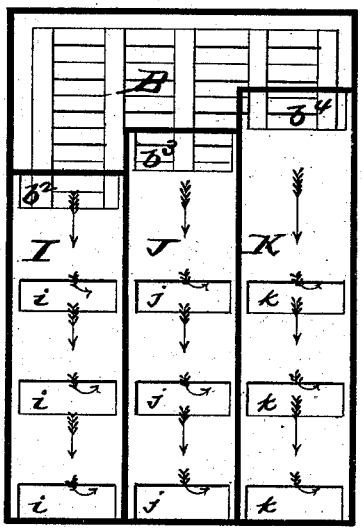

Figure 1 is a vertical section taken through a construction embodying the improvement; Fig. 2, a horizontal section taken on the line $x\ x$ of Fig. 3; Fig. 3, a transverse vertical section taken on the line $y\ y$ of Fig. 2; Fig. 4, a transverse vertical section taken on the line $z\ z$ of Fig. 2, but looking in the opposite direction to that of Fig. 3; Fig. 5, a vertical longitudinal section taken on the line $x'\ x'$ of Fig. 2; Fig. 6, a vertical longitudinal section taken on the line $y'\ y'$ of Fig. 2; Fig. 7, a longitudinal section, showing a modification in the manner of admitting the air to and discharging it from a refrigerating-apartment; Fig. 8, a vertical longitudinal section, showing a series of outlet-flues leaving the air-cooling chamber at different levels; and Fig. 9, a section taken on the line $v\ v$ of Fig. 8.

The same letters denote the same parts.

I have heretofore made improvements in refrigerator and refrigerating-houses wherein the desired refrigeration is effected by means of air-currents moving in a horizontal direction. In carrying out the present improvement the same principle is employed, a current or currents of pure, dry, cold air being passed horizontally through the apartment or apartments it is desired to refrigerate.

The special aims of the present invention are, first, in a series of two or more refrigerating-apartments, to supply from the same air-cooling chamber each one of the refrigerating-apartments with an independent current, so that the air shall come fresh and pure to each apartment without being first vitiated, contaminated, or heated by previously passing through an intervening apartment; second, from the same air-cooling chamber to supply refrigerating air of different temperatures.

The following features, considered generally, characterize the present improvement. The air-cooling chamber is on a level with or above any of the connected refrigerating-apartments. Connected with the exit-opening from the air-cooling chamber are one or more cold-air-supply flues or ducts for conducting the cold air to the refrigerating-apartments, and which extend along one end of the refrigerating-apartments, and which have at points desired one or more openings from said flues into said refrigerating-apartments for the passage of cold air thereinto; and connected with the inlet-opening into the upper part of the air-cooling chamber are one or more return air-flues or ducts extending along the opposite end of the refrigerating-apartments, and respectively opposite the supply flues or ducts, and which have one or more openings at points desired from said apartments into said return-flues for the passage of the warm air thereinto. Thus each refrigerating-apartment, whether one or more in number, is placed between and connects the supply and return flues. All of the openings referred to are fitted with doors or valves to regulate the flow of the air. An additional feature is conducting the refrigerating air-current from different levels of the air-cooling chamber to the apartment or apartments to be refrigerated, for this purpose using in some cases a single flue between the air-cooling chamber and refrigerating apartment or apartments, and in others as many different supply-flues as there are different levels in the air-cooling chamber from which the air is drawn. In the last case, if desired, each room in a large building may have a flue tapping each of the supply-flues, or each flue may lead to one apartment exclusively, thus drawing from the same cold-air reservoir air-currents of different temperatures and densities, according to the altitude of the respective outlets, as water of different pressures is drawn from outlets of different altitudes in a reservoir of water.

Referring to the drawings, A represents a building embodying the various features of the improvement, B being the air-cooling chamber, and C, C', C², D, D', D², E, and F various refrigerating-apartments cooled by air-currents flowing from the air-cooling chamber. The latter may be above or at the level of the refrigerating-apartments.

G represents the main supply-flue leading from the chamber B, and conveying the air to the refrigerating-apartments, and H represents the main flue, by which the air is conducted from the various refrigerating-apartments back into the air-cooling chamber. The arrows indicate the course of the air-currents—that is, leaving the air-cooling chamber at $b$, the air passes through the flue G into the apartments C C' C² at $c$ $c'$ $c^2$, thence through these apartments into the escape-flue H, and thence into the open air or into the air-cooling chamber at $b'$, the current in each refrigerating-apartment being independent of the currents in the other refrigerating-apartments. The air also passes from the flue G into any or all of the other refrigerating-apartments D E F, and, after traversing them, passing into the flue H, and thence to the open air or into the air-cooling chamber again. All of the various refrigerating-apartments can be used singly or simultaneously with any or all of the remaining apartments.

The refrigerating-apartments may be side by side, one above the other, or otherwise arranged, as the air-currents passing through them respectively are independent of the currents in all the other apartments.

The degree of refrigeration can also be regulated by drawing the air-currents from different levels of the air-cooling chamber, for the lower the level therein from which the air is taken the colder it is. To this end there may be a series of outlets, $b^2$ $b^3$ $b^4$, one above the other, from the air-cooling chamber into the flue G, as shown in Fig. 1, the outlets being furnished with valves. When colder air is desired the upper outlets are closed, and when warmer air is desired the lower outlets are closed. These outlets may all connect with the main flue G, as in Fig. 1, or with special flues I J K, as in Figs. 8 9. In the last case, as indicated at $i$ $j$ $k$, respectively, each refrigerating-apartment may have a connection with all of the flues I J K, thus enabling air (by suitably opening and closing valves at the openings $i$ $j$ $k$) to be drawn into the refrigerating-apartment from either of the outlets $b^2$ $b^3$ $b^4$, as desired. It may also be said that the best results are secured by having said outlets as high as is practicable above the places to be refrigerated.

Fig. 7 shows the air entering and leaving the refrigerating-apartment through many openings distributed throughout the height of the apartment—a desirable construction for preventing any possible stagnation of air in pockets or eddies in any part of the apartment. The openings in this case should be proportioned in size and number, so that they all will be needed to receive and discharge the air supplied. This construction also more effectually equalizes the temperature throughout the height of the apartment.

Any refrigerating agent or apparatus may be employed in place of ice to cool the air in the air-cooling chamber. In the drawings an ice-crib, $b^5$, is shown.

The air in the refrigerator or refrigerating-house can be discharged through outlets $a$ and replaced by fresh air through inlets $a'$ when desired.

The dotted lines at $a^2$, Fig. 1, are to indicate that the return-flue H can be carried up above and then over and down into the air-cooling chamber at its top, for the purpose of increasing the height of the cold-air column in the air-cooling chamber.

The air-circulation described herein is automatic, but it may be aided by auxiliary means.

I claim—

1. The combination, in a refrigerator or refrigerating-house, of an air-cooling chamber, B, a supply-flue, G, a return-flue, H, and two or more horizontally-extended refrigerating-apartments, said apartments being independent of each other, and said flues being connected with said apartments at or near the ends of the latter, substantially as described.

2. In a refrigerator or refrigerating-house, an air-cooling chamber having a series of outlets, $b^2$ $b^3$ $b^4$, arranged at different altitudes and furnished with valves, for the purpose of drawing at will air from different levels of the air-cooling chamber, substantially as described.

3. The combination, in a refrigerator or refrigerating-house, of an air-cooling chamber and a refrigerating-apartment, the air circulating horizontally through said apartment and entering and leaving the latter through many openings distributed throughout the height of the apartment, substantially as described.

Witness my hand.

D. W. C. SANFORD.

Witnesses:
C. D. MOODY,
G. H. LOKER.